Figure 1:
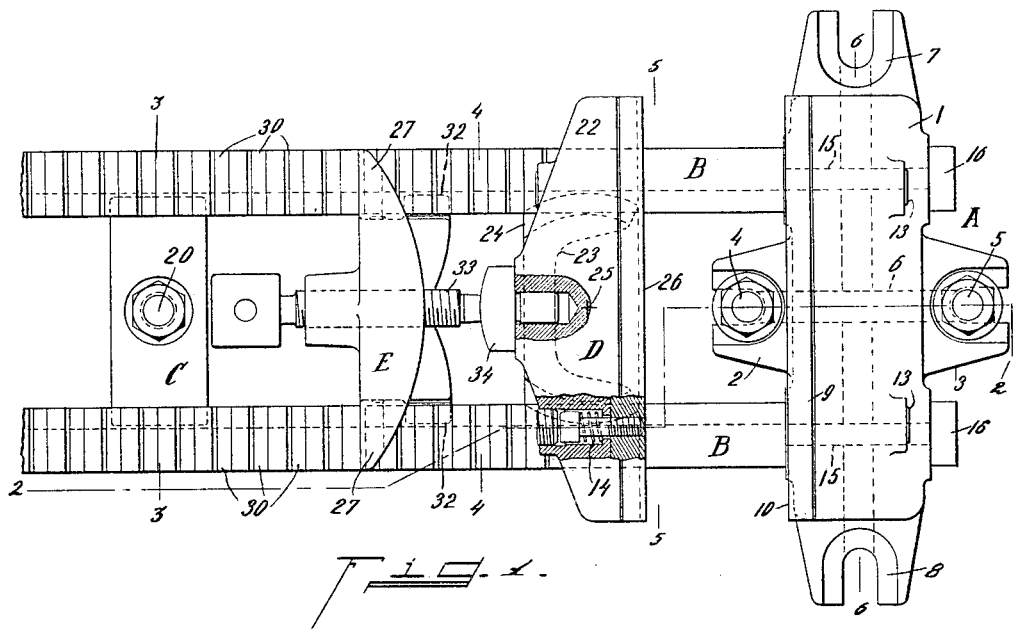

A. L. DE LEEUW.
KNOCKDOWN VISE.
APPLICATION FILED MAY 27, 1913.

1,120,649.

Patented Dec. 8, 1914.
2 SHEETS—SHEET 1.

Witnesses

Inventor
Adolph L. De Leeuw
By Wood Wood & Nathan
Attorneys

A. L. DE LEEUW.
KNOCKDOWN VISE.
APPLICATION FILED MAY 27, 1913.
1,120,649.
Patented Dec. 8, 1914.
2 SHEETS—SHEET 2.
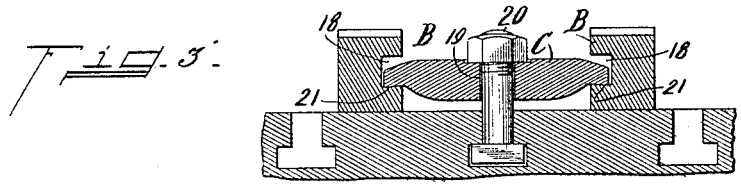
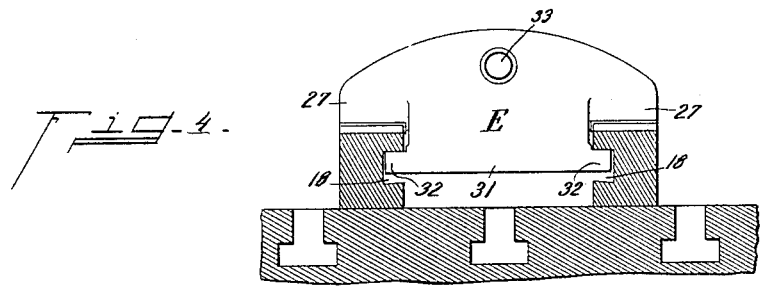
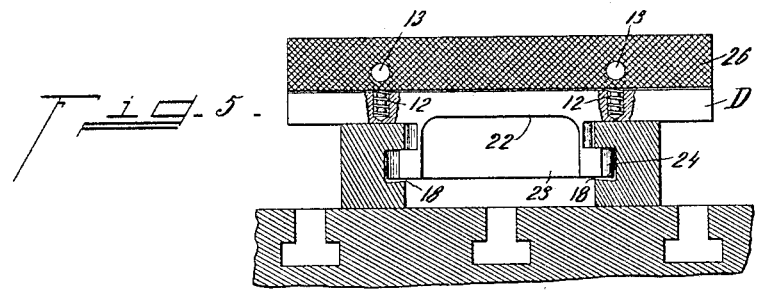
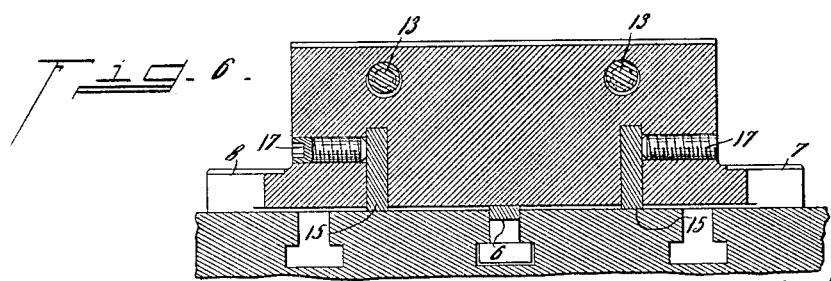
Witnesses
C. B. Foster
Oliver B. Kaiser
Inventor
Adolph L. De Leeuw
By Wood, Wood & Nathan
Attorneys

UNITED STATES PATENT OFFICE.

ADOLPH L. DE LEEUW, OF CINCINNATI, OHIO, ASSIGNOR TO THE CINCINNATI MILLING MACHINE COMPANY, OF OAKLEY, CINCINNATI, OHIO, A CORPORATION OF OHIO.

KNOCKDOWN VISE.

1,120,649.     Specification of Letters Patent.     Patented Dec. 8, 1914.

Application filed May 27, 1913. Serial No. 770,169.

*To all whom it may concern:*

Be it known that I, ADOLPH L. DE LEEUW, a citizen of the United States, and residing at Cincinnati, in the county of Hamilton and State of Ohio, have invented a new and Improved Knockdown Vise, of which the following specification is a full disclosure.

This invention deals with an improved vise and it is concerned with certain structural characteristics enhancing the serviceability of vises, and also it proposes features especially adapting vises for use in connection with machine tools.

One object within the contemplation of this invention is to create a vise-structure adapted to fill the office of an auxiliary attachment for machine tools and well adapted to be bolted to the table or carriage of such machine tool to hold the work very firmly, while at the same time occupying no more space than is necessary.

Another object is to render available a simple and durable vise embodying features for automatically drawing the work firmly onto the supporting surface whenever the jaws are brought into clamping relation with said work, so as not only to clamp the sides of the work, but also hold the same firmly onto its underlying supporting surface, thus mounting it as rigidly as possible on the table of the machine tool.

Another object is to devise a vise of a "built up" nature and such that its component parts may be shipped or kept in a tool box, and assembled very quickly for immediate use on the table of a machine tool, and further to design the same so that its capacity may be greatly extended by the use of very few additional parts.

Other objects will be in part obvious from the annexed drawings and in part indicated in connection therewith by the following analysis of this invention.

This invention accordingly consists in the features of construction, combination of parts, and in the relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 2:
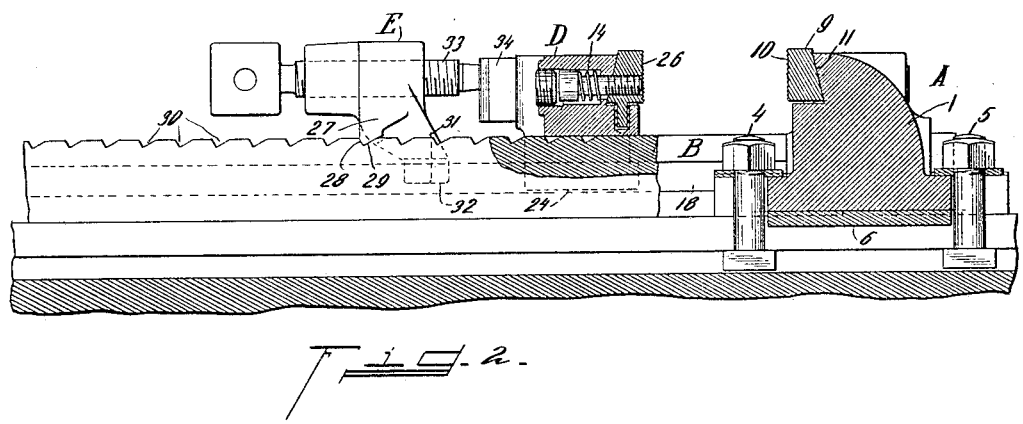

Figure 1 is a top plan view showing the vise assembled and illustrating various characteristic features thereof. Fig. 2 is a section taken through line 2—2 of Fig. 1, showing further details of the construction, and illustrating the wedge-like moving jaw-piece. Fig. 3 is a transverse section taken through line 3—3, of Fig. 1, showing how the rails of the vise are clamped at their distant ends to the table of the machine tool. Fig. 4 is a section through line 4—4 of Fig. 1, showing the follower which interlocks at successive stations to the rails and provides means for forcing the follow-jaw against the work. Fig. 5 is a section through line 5—5 of Fig. 1, looking toward the clamping face of the follow-jaw, parts being broken away to illustrate the structure providing downward play of the jaw-piece under clamping pressures. Fig. 6 is a section through line 6—6 of Fig. 1, showing the means whereby the fixed jaw is clamped to the rails.

Continuing now by way of a more detailed description, it may be noted that preferably this vise is formed of a head serving also as a fixed jaw and adapted to be clamped directly to the table; a pair of rails detachably secured to the head providing means for clamping their remote extremities to the table at any desired point, and also follow-jaw construction adapted to be secured at any station to the rails, and providing means for applying clamping pressures to advance the same into clamping relation with the work.

The fixed jaw is indicated by A, and consists of an elongated slotted body portion 1, preferably providing slotted wings 2 and 3 extending coincidentally with the longitudinal center-line of the vise, and adapted to receive the shanks of bolts 4 and 5, which secure in place a fin 6 adapted to be snugly received in one of the T-slots of the table. This construction, being detachable and interchangeable enables a fin of any proportion to be used to meet any given size of slot and it is to be observed that the slotted wings 2 and 3 are low so that the head of the bolt does not rise above the upper surface of the rails, and thus come in contact with the work. Extending outwardly from the ends of the fixed jaw A are also similar slotted wings 7 and 8, which are adapted to receive bolts taking into slots of the table whereby the fixed jaw may be clamped securely onto the table; the fin thus maintaining the vise in parallelism with the slots, as will be understood. It is noteworthy that the wings 7 and 8 are preferably counterparts of wings 2 and 3, so that the above mentioned relation may be interchanged, if desired; a longer fin being in this instance employed and the wings 2 and 3 being now used for clamping the fixed jaw on to the table. Should it be desired to have the work bear directly on the table, the jaw-piece may be constructed to overhang the wing 2, or the latter may be dispensed with. This fixed jaw A preferably provides a self-adjusting jaw-piece 9 having a scored or roughened clamping face 10, and a downwardly and outwardly inclined face 11, which is backed against a similarly sloping face of the body portion 1 of the fixed jaw. Normally, this self-adjusting jaw-piece is held slightly elevated by means of springs 12 seated in sockets provided by an underlying portion of the fixed jaw and pressing upwardly against the under surface of the self-adjusting jaw-piece 10. The latter is held in place by means of a pair of bolts 13 which have their ends screw-threaded into the self-adjusting jaw-piece, and are caused to draw the same against the sloping face of the fixed jaw by means of expansible springs 14.

The rails B extend in parallelism from the fixed jaw, to which they are preferably secured. This is accomplished by cutting away the ends of the rails to provide a narrow web 15 terminating in a head 16 and received in a corresponding slot extending upwardly from the under side of the fixed head A. Hollow-headed set-screws 17 engage the webs 15 and hold the parts rigidly together. The opposing longitudinal faces or sides of the rails are provided with slots 18 for positioning the follow-jaw and guiding the follower, and also for receiving and accommodating the straddle bar which clamps the rails down to the bed at any desired point. This will now be described.

The straddle-bar C consists of a member having an intermediate aperture 19 adapted to receive a bolt 20 adapted to engage a T-slot of the supporting table whereby the straddle bar may be clamped down toward the same. The ends of the straddle bar C provide slightly inclined clamping faces 21 adapted to rest upon the similarly inclined bottom faces of the slots 18 in the sides of the rails B. This construction eliminates a spreading of the rails under the movement of the straddle-bar C.

The follow-jaw D consists of a body portion 22 adapted to ride upon the upper surface of the rails B and having a depending intermediate portion 23 from which horizontally extend circular segments 24 adapted to enter the slots 18 of the rails. The outer circular contoured segments 24 are inscribed about a center 25, so that the point 25 will be kept in coincidence with the central longitudinal plane of the vise, while yet permitting the follow-jaw to swivel about the point 25. This follow-jaw carries a self-adjusting jaw-piece 26 mounted and constructed thereon in the same way that the similar piece 10 is arranged on the fixed jaw. It will be noted that the follow-jaw D is freely movable on the rails B and is capable of swiveling about the vertical axis 25 so that it may be brought into contact with any work that may be laid on the rails B against the fixed jaw. The means for exerting clamping pressures will now be described.

The follower E consists of a member having side wings 27 extending over the rails B and providing abutment faces 28 angled at about 30° to the perpendicular, which in this instance will bring the line of pressure normal to such faces. The other side 29 will preferably extend parallel with the said line, or in other words, at right angles with the abutment face 28. Counterpart notches 30 are spaced along the top face of the rails B so that the wings 27 may be received in said notches at any desired station. An intermediate portion 31 extends downwardly from the follower E between the rails and provides forwardly positioned feet 32 that enter the slots in the rails and bear against the top faces of said slots to resist overturning of the follower E under clamping pressures. Extending through the center line of the follower E is a suitable clamp screw 33 which at its forward end bears against a segment block 34 secured to the follow-jaw D and having its periphery inscribed about the center 25 so that in any angled position of the follow-jaw D the clamp screw 33 will exert pressure directly through the center 25. It will thus be seen that this invention is well adapted to achieve the objects and advantages enumerated in the foregoing and constitutes a very simple and serviceable structure. By reason of the self-adjusting jaw piece, any work clamped between the jaws will be drawn tightly under the rails B and thus maintained against any possible vibration. At the same time, by reason of the capacity for swiveling possessed by the follow-jaw, angled work may be clamped as well as straight work. The whole may be assembled with ease and it may be stored away in the tool box by occupying little room, and since the rails may be made of any length, the vise has almost unlimited capacity.

Having revealed my invention, I claim as new and desire to secure by Letters Patent of the United States:—

1. A knock-down vise of the nature disclosed combining a fixed jaw having means for clamping it to a table, a pair of rails detachably connected to and extending in parallelism from said fixed jaw and spaced apart, a follow-jaw riding on said rails, a follower adapted to interlock at one of a series of stations with said rails and having a clamping screw extending into abutment with the follow-jaw to force the same toward the fixed jaw, and means for clamping the rails to a table.

2. A knock-down vise of the nature disclosed combining a fixed jaw, a pair of rails spaced apart and detachably connected to said jaw and extending in parallelism therefrom, a follow-jaw riding on said rails and having a circular member extending therebetween adapted to enable said follow-jaw to be swiveled on said rails and maintain its center in coincidence with the center plane of the vise, a follower adapted to be engaged with the rails at any one of a series of stations, and a screw extending from said follower to said follow-jaw and adapted to urge the latter toward the fixed jaw.

3. A knock-down vise of the nature disclosed combining a fixed jaw having means for clamping it to a table, a pair of spaced rails extending in parallelism from and detachably secured to said fixed jaw, a follow-jaw slidably retained by said rails, a follower adapted to interlock at any one of a series of stations with said rails, a clamping screw extending through the middle of said follower into abutment with a rear portion of the follow-jaw to force the same toward the fixed jaw, and means for clamping the rails at any station to a table.

4. A knock-down vise of the nature disclosed combining a fixed jaw, a pair of spaced rails extending in parallelism therefrom and detachably secured thereto, a follow-jaw riding on said rails and having a circular member interfitting therebetween adapted to enable said follow-jaw to be swiveled on said rails while maintaining its center in coincidence with the central vertical plane of the vise, a follower adapted to be engaged with the rails at any one of a series of stations, and a screw extending from said follower to said follow-jaw and adapted to urge the latter toward the fixed jaw.

In witness whereof, I hereunto subscribe my name, as attested by the two subscribing witnesses.

ADOLPH L. DE LEEUW.

Witnesses:
  ALBERT F. NATHAN,
  OLIVER B. KAISER.